United States Patent Office 3,387,145
Patented June 4, 1968

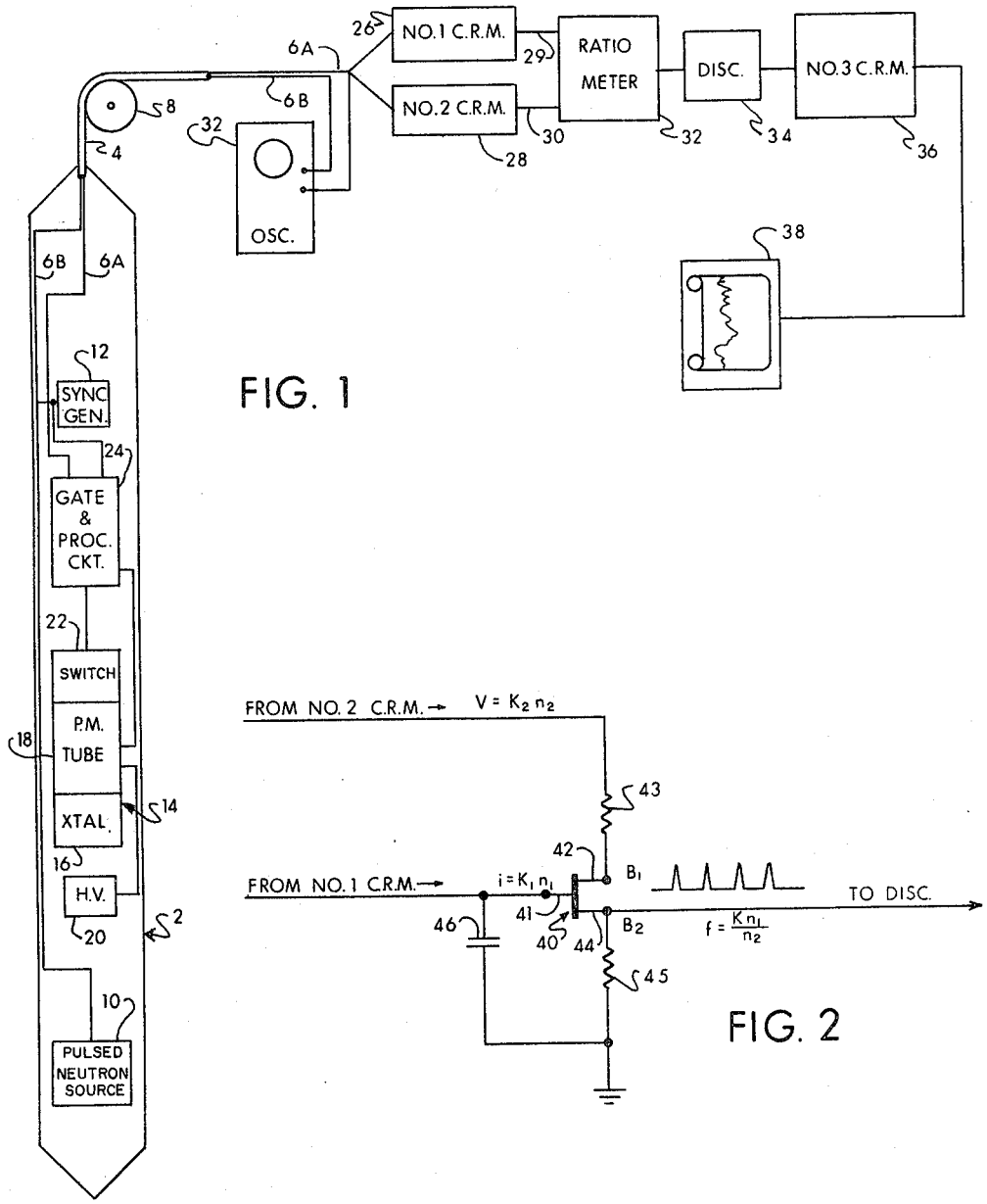

3,387,145
COMPUTER RATIO CIRCUIT FOR WELL LOGGING SYSTEM USING UNIJUNCTION TRANSISTOR
Eric C. Hopkinson, Houston, Tex., assignor to Dresser Industries, Inc., Dallas, Tex., a corporation of Delaware
Filed Nov. 9, 1964, Ser. No. 409,687
2 Claims. (Cl. 307—235)

ABSTRACT OF THE DISCLOSURE

A uni-junction transistor is connected with a radioactivity well logging apparatus in a particular manner to produce an output signal which is representative of the ratio of two input electrical signals. A first electrical circuit produces an electrical current which is functionally related to one of the two input signals, and another electrical circuit, separate from the first circuit, produces an electrical voltage which is functionally related to the other of the two input signals. The electrical current is connected to the emitter electrode of the uni-junction transistor, and the electrical voltage is connected to the first base electrode. With these two separate input signals connected in this manner, the output signal from the second base electrode of the uni-junction transistor is a voltage which represents the ratio of the two separate input signals.

This invention relates to apparatus for radioactivity well logging, and more particularly relates to apparatus for deriving the ratio of two correlated well logging measurements.

It is well known that oil and gas are found trapped in earth formations at various depths below the surface of the earth, and that boreholes are drilled from the surface to tap these petroleum-bearing formations. It is also well known that surveying systems employing a cable-supported logging instrument are used to investigate the character of the formations surrounding these boreholes, wherein the instrument is drawn through the borehole, and wherein electrical indications of the substances adjacent the instrument are processed and recorded.

Recently novel well logging methods and apparatus have become available wherein the instrument is caused to continuously bombard the adjacent formation with discrete bursts of high energy neutrons, and wherein the rate of decline of each burst of neutrons is sought to be measured. More particularly, the instrument-emitted bursts of neutrons are produced at a rate such that the neutrons in each burst are slowed down and captured by the irradiated formation nuclei before each succeeding instrument-emitted burst, and it is the rate of capture of the neutrons which is primarily sought to be measured.

The instrument contains a gamma ray detector which is responsive to gamma rays produced by capture reactions with the formation nuclei, and derives a series of electrical pulses which are representative of the incidence of these gamma rays on the detector. The instrument further contains a gating circuit which is preferably adapted to hold the detector inactive except during two separate but equal preselected time intervals between each instrument-emitted burst of neutrons. Accordingly, the detector produces a first group of pulses during the first time interval, and thereafter a second group of pulses during the second time interval, following each neutron irradiation interval.

The number of electrical pulses in each group is representative of the number of gamma rays present during that time interval, and thus is representative of the number of thermal neutrons being captured during the time interval. Furthermore, the number of electrical pulses in the second group is less than the number of electrical pulses in the first group, since the number of gamma rays present because of capture reactions declines steadily following each neutron burst. Accordingly, it will be apparent that the ratio of the number of electrical pulses in the first group to the number in the second group is a function of the decline rate of the thermal neutrons produced by the particular neutron burst immediately preceding the two detection intervals.

In the co-pending application filed Apr. 20, 1964, by E. C. Hopkinson and A. B. C. Marshall, and having Ser. No. 361,159, Patent No. 3,358,142 there is depicted apparatus for providing the foregoing measurements, wherein the electrical pulses producing during the first interval are applied to a first counting rate meter, and wherein the electrical pulses produced during the second interval are routed to a second separate counting rate meter. The two counting rate meters each produce output signals, which may be either voltages or currents, but which are proportional in magnitude to the frequency of the pulses they receive. Each output signal is applied to a different pen in a conventional 2-pen recorder, whereby two separate but functionally correlated recordings are graphically prepared on a conventional strip-type recording chart. The magnitude of pen deflections, of course, is employed to determine the ratio of the inputs to the two count rate meters.

The foregoing technique of separately recording the pulses generated during the two detection intervals has certain obvious disadvantages. First, it is the ratio of the two signals which is sought to be obtained, and not the signals themselves. Accordingly, computations based on the relative positions of two pen traces introduces human judgment into the measurement concomitant with human error. Second, even when no serious errors are made the computations are tedious to make—especially where the two pen traces relate to several thousand feet of borehole logging. Third, each of the two detector output signals is affected by fluctuations in the neutron output from the logging instrument. Nowisthstanding, if a ratio is taken of each pair of electrical pulse groups, this error factor will be substantially cancelled. However, since the instrument-emitted bursts are preferably produced at rates of 1,000–5,000 bursts per second, such computation is impossible to perform by hand.

These disadvantages are eliminated by means of the apparatus hereinafter depicted and described, wherein a circuit or network is provided for electrically deriving a recordable indication of the ratio of both groups of detector pulses produced between each high energy neutron burst. In particular, means are provided wherein the output signal from one of the foregoing count rate meters is a current and wherein the output signal from the other count rate meter is a voltage. A uni-junction transistor is connected so that the voltage output is connected to one base electrode, and the current output is connected to the emitter electrode, whereby the output signal from the other base electrode is a series of pulses of a frequency which is related to the sought-for ratio.

Accordingly, it is an object of the present invention to provide apparatus for deriving the ratio of two independent electrical signals.

Further, it is an object of the present invention to provide novel apparatus for deriving the ratio of the count rates of two different groups of pulses.

In particular, it is an object of the present invention to provide novel apparatus for deriving the ratio of the rates of occurrence of detected radiations during two separate but equal time intervals, whereby the decline rate of such radiations may be determined at a very high frequency.

These and other objects of the present invention will be apparent from the following description wherein reference is made to the accompanying drawing.

In the drawing:

FIGURE 1 is a functional representation of a well logging system employing the present invention for determining the rate of decline of successive bursts of neutrons in adjacent earth formations.

FIGURE 2 is a schematic representation of one form of the ratio-taking circuitry employed in the system shown in FIGURE 1 for deriving the rate of decline of the bursts of neutrons.

Referring now to FIGURE 1, there may be seen a functional representation of a radioactivity well logging system, including an elongated pressure and fluid-resistant housing 2 which is adapted to be passed through a borehole, and which is suspended at one end of a conventional logging cable 4. The cable 4 may be passed over and supported by a measuring wheel 8 for generating an indication of the depth at which the housing 2 is located in the borehole. The measuring wheel 8 may be supported over the mouth of the borehole in any convenient manner, as by a traveling block supported by a derrick.

Included within the housing 2 is a neutron source 10, which may be a static atmosphere D-T ion accelerator of the type depicted in U.S. Patent No. 2,689,918, which issued Sept. 21, 1954, to A. H. Youmans. The housing 2 also contains a radiation detector 14, composed of a scintillation crystal 16, a photomultiplier tube 18, and a high voltage source 20. Further included within the housing 2 is a sync pulse generator 12 having its output of sync pulses connected to the neutron source 10, conductor 6B of cable 4, and a gating and signal processing circuit 24 which has its input terminal connected to the output of the detector 14. The output of the gating and signal processing circuit 24 is connected to conductor 6A of cable 4. At the surface of the earth, conductor 6A is connected to the inputs of the No. 1 count rate meter 26, the No. 2 count rate meter 28, and to one input terminal of a conventional oscilloscope 32 for monitoring purposes. Conductor 6B, at the surface, is connected to another input terminal of the oscilloscope 32. The outputs of the No. 1 and No. 2 count rate meters are both connected through conductors 29 and 30, respectively, to a ratio meter 32 which has its output connected through a conventional discriminator 34, and through a third count rate meter 36, to a conventional single-pen recorder 38.

During logging operations with the system depicted in FIGURE 1, the housing 2 is passed through the borehole in the earth while the sync generator 12 actuates the neutrons source 10 so as to irradiate the interior of the borehole with a series of bursts or pulses of high energy neutrons. The sync generator 12 simultaneously actuates the gating and signal processing circuitry 24 to turn the detector 14 "on" during two preselected equal time intervals between each neutron pulse. Each radiation incident on the crystal 16 produces a scintillation of light in the crystal, and the photomultiplier tube 18 is arranged and adapted to respond (when activated) to each scintillation it "sees" by generating a corresponding voltage pulse. However, the switch 22 is adapted to prevent the photomultiplier tube 18 from producing any pulses except during the two separate but equal intervals prescribed by the gating and signal processing circuitry 24. Any switching means may be used for the switch 22. However, it is preferable that the switch 22 be of a type which merely "paralyzes" an energized photomultiplier tube 18, rather than one which merely energizes or de-energizes it, and thus the switch 2 is preferably of the type depicted in the co-pending patent application filed Dec. 31, 1962 by E. C. Hopkinson, and having Ser. No. 248,568.

The gating and signal processing circuitry 24 is further adapted to produce a first group of positive data pulses corresponding to the detector 14 output pulses produced during the first time interval, and a second group of negative data pulses corresponding to the detector 14 output pulses produced during the second time interval. These positive and negative output pulses are transmitted to the surface by way of conductor 6A in the logging cable 4. At the surface, both groups of data pulses are applied to the No. 1 and No. 2 count rate meters 26 and 28. The No. 1 count rate meter 26 is adapted to respond only to positive pulses, and therefore it generates preferably an output current which is functionally related in magnitude to the intensity of radiation sensed by the detector 14 during the first of the two detection intervals. The No. 2 count rate meter 28 is adapted to respond only to negative pulses, and therefore it generates an output voltage which is functionally in magnitude related to the intensity of radiation sensed by the detector 14 during the second of the two detection intervals. The outputs of the No. 1 and No. 2 count rate meters may be connected through conductors 29 and 30, respectively, to the ratio meter 32.

As hereinbefore stated, the ratio meter 32 responds to these two input signals by deriving a sequence of output voltage pulses at a frequency which is functionally related to the ratio of the signals on conductors 29 and 30. These output pulses from the raito meter 32 vary in amplitude according to the magnitude of the voltage in conductor 30. Although these amplitude fluctuations are not critical, and although the output from the ratio meter 32 may be applied directly to the No. 3 count rate meter 36 which, in turn, derives either a voltage or a current output for driving the recorder 38. However, it is preferable to apply the output pulses from the ratio meter 32 to a conventional pulse height discriminator 34, which has a very low trigger level, and which generates a standard voltage pulse in response to each "accepted" pulse from the ratio meter 32. The output pulses from the discriminator 34 are then used to drive the No. 3 count rate meter 36 and the recorder 38.

As hereinbefore stated, both conductors 6A and 6B may be conducted to respective input terminals of a conventional oscilloscope 32. Accordingly, the oscilloscope will then provide a visible indication of the relationship of the two groups of pulses from the detector 14, with respect to each other and to the sync pulse, in order that proper timing of the detection intervals may be obtained.

Referring now to FIGURE 2, there may be seen a schematic representation of the details of the ratio meter 32 depicted in FIGURE 1, which includes a uni-junction transistor 40 having its emitter electrode 41 connected to receive the output currents generated by the No. 1 count rate meter 26, and having its No. 1 base electrode 42 connected through a load resistor 43 to receive the output voltages generated by the No. 2 count rate meter 28. The No. 2 base electrode 44 is connected to one end of a grounded load resistor 45 and to the input terminal of the discriminator 34. A capacitor 46 is connected between the grounded end of resistor 45 and the emitter electrode 41.

Let V represent the voltage received from the No. 2 count rate meter 28, $i$ represent the current received from the No. 1 count rate meter 26, C represent the capacitance of capacitor 46, $V_p$ represent the trigger voltage of the transistor 40, and $r$ represent the intrinsic standoff ratio of the transistor 40. Accordingly, it may be seen that capacitor 46 will charge linearly to the trigger voltage $V_p$, whereupon the transistor 40 will conduct current from the emitter electrode 41 to the No. 2 base electrode 44 to deliver an output voltage pulse to the discriminator 34. The capacitor 46 is then discharged and the transistor 40 returns to its original non-conducting state.

$V_p$ is related to V by the intrinsic standoff ratio $r$. Accordingly, the transistor 40 will conduct whenever the voltage at the emitter electrode 41 is equal to the product of the standoff ratio and the voltage on the No. 1 base electrode 42. This may be restated as follows:

$$Vp = Vr$$

The time $t$ required for capacitor 46 to attain a charge equal to $Vp$ may be stated as follows:

$$CVp = it$$

and $$CVp = CrV$$

or $$t = \frac{CrV}{i}$$

Let $f$ represent the frequency of the output pulses in the No. 2 base electrode 44, and since the time required for the capacitor 46 to develop $Vp$ is also equal to the time interval between conductions by the transistor 40, then $$t = \frac{1}{f} = \frac{CrV}{i}$$

and $$f = \frac{i}{CrV}$$

Let $n_1$ represent the pulse rate of the input to the No. 1 count rate meter 26, and let $n_2$ represent the pulse rate of the input to the No. 2 count rate meter 28. Then, if $i$ is related to $n_1$, and if V is related to $n_2$, $$i = k_1 n_1$$

and $$V = k_2 n_2$$

where $k_1$ is the proportionality constant for the channel leading to the No. 1 count rate meter 26, and $k_2$ is the proportionality constant for the channel leading to the No. 2 count rate meter 28. Thus, it may be seen that $$f = \frac{k_1 n_1}{Cr k_2 n_2}$$

and that $$f = \frac{k n_1}{n_2}$$

It should be clearly understood that the usefulness of the present invention is not limited to the employment depicted for it in FIGURE 1. The ratio taking properties of the present invention may be found suitable for many uses where the inputs include a proper voltage and a proper current.

Numerous other variations and modifications may obviously be made without departing from the concept of the present invention. Accordingly, it should be clearly understood that those forms of the present invention which are described herein and depicted in the accompanying drawings, are illustrative only, and are not intended to limit the scope of the invention.

What is claimed is:

1. Apparatus for deriving an electrical output signal which is representative of the ratio of a first input electrical signal in radioactivity well logging apparatus to a second input electrical signal, said apparatus comprising
   first means for deriving an electrical current which is functionally related to said first input signal,
   second means separate from said first means for deriving an electrical voltage which is functionally related to said second input signal,
   a uni-junction transistor having its first base electrode connected to said second means and having its emitter electrode connected to said first means, said transistor also having a conductivity threshold which is related to the voltages on the emitter and first base electrodes, and
   means for periodically creating a voltage on the emitter electrode.

2. Apparatus for deriving an electrical output signal which is representative of the ratio of a first input electrical signal in radioactivity well logging apparatus to a second input electrical signal, said apparatus comprising
   first means for deriving an electrical current which is functionally related to said first input signal,
   second means separate from said first means for deriving an electrical voltage which is functionally related to said second input signal,
   a uni-junction transistor having it first base electrode connected to said second means and having its emitter electrode connected to said first means, and
   a capacitance interconnected between the second base electrode and the emitter electrode of a said uni-junction transistor,
   said second base electrode also being connected to a reference voltage.

References Cited

UNITED STATES PATENTS 3,226,627  12/1965  Fromkin ........... 307—88.5
3,253,157  5/1966  Lemon ............ 307—88.5

ARTHUR GAUSS, *Primary Examiner.*

DAVID J. GALVIN, *Examiner.*

J. BUSCH, R. H. PLOTKIN, *Assistant Examiners.*